United States Patent
Neuhaus et al.

(10) Patent No.: US 6,955,409 B2
(45) Date of Patent: Oct. 18, 2005

(54) VEHICLE AUTOMATIC DISTANCE CONTROL SYSTEM AND METHOD

(75) Inventors: Detlev Neuhaus, Hannover (DE); Frank Zielke, Barsinghausen (DE)

(73) Assignee: Wabco GmbH & Co. oHG, Hannover (DE)

(*) Notice: Subject to any disclaimer, the term of this patent is extended or adjusted under 35 U.S.C. 154(b) by 0 days.

(21) Appl. No.: 10/452,778

(22) Filed: May 30, 2003

(65) Prior Publication Data

US 2004/0036352 A1     Feb. 26, 2004

(30) Foreign Application Priority Data

Jun. 1, 2002     (DE) ................ 102 24 399

(51) Int. Cl.[7] ............ B60K 31/00; B60K 28/10; B60T 7/12
(52) U.S. Cl. ............ 303/191; 303/20; 303/193; 180/169; 180/197; 701/96; 701/301
(58) Field of Search ............ 303/191, 193, 303/20, 7, 123, 118.1, 142–149; 180/167–169, 180/197; 701/301, 96, 70–90, 48; 340/435, 340/441; 342/71; 188/3 ALL

(56) References Cited

U.S. PATENT DOCUMENTS

| | | | |
|---|---|---|---|
| 5,864,285 A | * | 1/1999 | Wieder et al. ............ 340/435 |
| 5,889,476 A | * | 3/1999 | Schmitz ............ 340/903 |
| 6,357,839 B1 | * | 3/2002 | Eckert ............ 303/142 |
| 6,405,116 B1 | * | 6/2002 | Koibuchi ............ 701/70 |
| 2004/0036352 A1 | * | 2/2004 | Neuhaus et al. ............ 303/191 |

FOREIGN PATENT DOCUMENTS

| | | |
|---|---|---|
| DE | 195 46 652 A1 | 6/1997 |
| DE | 196 07 788 A1 | 9/1997 |
| DE | 197 04 841 A1 | 8/1998 |
| DE | 100 39 920 A1 | 3/2001 |
| DE | 010224399 A1 | * 12/2003 |
| JP | 02002013424 A | * 1/2002 |

OTHER PUBLICATIONS

STIC obtained translation of JP2002-13424A, which was cited in last office action.*

Intelligente Tempomaten halten Abstand, 20 VDI-Nachrichten, Sep. 3, 1999, Nr. 35.

* cited by examiner

Primary Examiner—Douglas C. Butler
(74) Attorney, Agent, or Firm—Kramer Levin Naftalis & Frankel LLP

(57) ABSTRACT

A vehicle equipped with an anti-lock brake system (ABS) and with anti-slip regulation (ASR) and having the capability of automatically controlling the distance from a vehicle driving in front whereby various vehicle deceleration devices are actuated automatically if the distance becomes shorter than a preset minimum safe distance. For deceleration of the vehicle if the distance from a vehicle driving in front becomes shorter than the preset minimum safe distance, the ASR function used for braking the drive axles of the vehicle is actuated.

21 Claims, 2 Drawing Sheets

VEHICLE AUTOMATIC DISTANCE CONTROL SYSTEM AND METHOD

BACKGROUND OF THE INVENTION

The present invention is directed generally to an improved automatic vehicle distance control system and method.

According to the article titled "Intelligent Tempomats Maintain Distance," published in VDI-Nachrichten, 3 Sep. 1999, 35, page 20, distance control Tempomats (cruise-control systems) and automatic lane recognition are typical assist systems that will soon be available in trucks and buses. If, in a vehicle equipped with such automatic distance control capabilities, the distance from a vehicle driving in front becomes shorter than a preset safe distance, various braking devices are automatically actuated. For example, the retarder may be actuated, or the service brake may be used (which acts on all vehicle wheels).

Vehicles having service brakes that can be automatically actuated are usually equipped with electronically controlled brake systems (EBS). For vehicles equipped with conventional brake systems, including anti-lock brake systems (ABS), and anti-slip regulation systems (ASR), however, the brakes cannot be actuated directly by an external signal or by an action not initiated by the driver. Such brake systems must be modified for this purpose, which can involve adding components, including additional solenoid valves, with associated undesired increases in vehicle complexity.

Accordingly, it is desired to provide a vehicle equipped with a conventional ABS/ASR and automatic distance control with the capability of at least partial automatic actuation of the service brake in operation of the automatic distance control function, without undue complexity.

SUMMARY OF THE INVENTION

Generally speaking, in accordance with the present invention, for a vehicle equipped with a conventional ABS/ASR and automatic distance control, an improved system and method are provided to effect at least partial automatic actuation of the service brake in operation of the automatic distance control function, without undue complexity.

The distance between the vehicle and a second vehicle driving in front of the vehicle and/or the approach speed of the vehicle with respect to the second vehicle is/are determined using the vehicle automatic distance control system which includes one or more distance sensors. If the distance between the vehicle and the second vehicle is less than a preselected safe distance, or if the approach speed of the vehicle with respect to the second vehicle has reached a speed that is critical for the distance from the second vehicle, the ASR function is actuated by the electronic control unit (ECU) of the ABS/ASR to brake the drive axle(s) of the vehicle.

Brake actuation in connection with automatic distance control according to the present invention requires only software/program enhancement of the ECU. Additional hardware (such as additional solenoid valves) is not necessary.

In one embodiment, the ECU is adapted to recognize if the vehicle brake pedal has been depressed, and, if so, automatic braking via the ASR is commensurately adjusted.

In another embodiment, the ECU is adapted to effect variable pressure control of the brake cylinders of the drive axle(s) as a function of the distance between the vehicle and the second vehicle and/or the approach speed of the vehicle by appropriate actuation of ABS valves.

In yet another embodiment, a trailer coupled to the vehicle can also be automatically braked by the vehicle automatic distance control system. An additional solenoid valve is provided which is actuatable by the ECU. If the distance between the first vehicle of the vehicle train and a vehicle driving in front is less than the preselected safe distance or if the approach speed of the vehicle train with respect to the vehicle driving in front has reached a speed that is critical for the distance from the vehicle in front, the ECU opens the additional solenoid valve together with the ASR valves to feed brake pressure to the trailer via a coupling head attached to the trailer.

Accordingly, it is an object of the present invention to provide a commercial vehicle equipped with ABS/ASR with an improved automatic distance control system and method whereby at least partial automatic actuation of the vehicle service brake in operation of the automatic distance control function can be effected.

It is also an object of the present invention to provide an improved automatic distance control system and method for a vehicle equipped with ABS/ASR that utilizes the ASR function to effect operation of the automatic distance control function.

It is another object of the present invention to provide an improved automatic distance control system and method for a vehicle equipped with ABS/ASR that is not undesirably complicated.

It is yet another object of the present invention to provide an improved automatic distance control system and method for a vehicle train equipped with ABS/ASR.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicted in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

Figure 1:
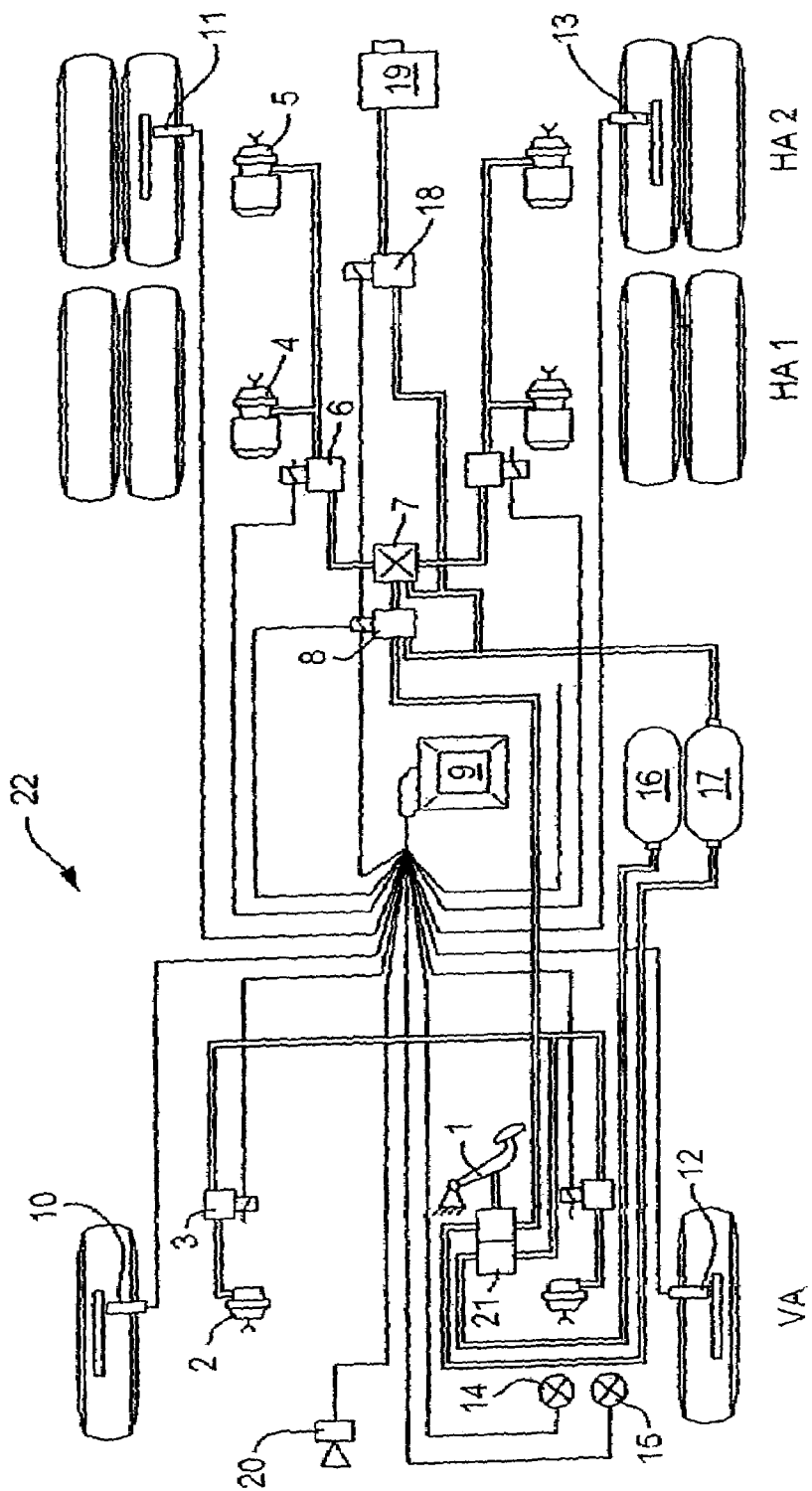
FIG. 1 is a schematic diagram showing the pneumatic and electrical parts of a brake system for a conventional commercial vehicle having two drive axles or rear axles (HA 1, HA2) and a steering axle or front axle (VA)

Referring now to FIG. 1, there is shown in simplified schematic form the brake system of a conventional commercial vehicle, generally indicated as 22, having three axles VA, HA1 and HA2. The wheels of the front axle VA are equipped with wheel-speed sensors 10, 12, and the wheels of the second rear axle HA2 are equipped with wheel-speed sensors 11, 13. The output signals of the wheel-speed sensors 10, 11, 12 and 13 are delivered to an ABS/ASR ECU 9.

The front axle VA is braked by means of compressed air from a supply tank 16. This air is released via a two-piece brake valve 21, ABS valves 3 and brake cylinders 2 to brake the front vehicle wheels when the vehicle driver depresses a brake pedal 1.

While the brake system of the vehicle 22 depicted in FIG. 1 is of the pneumatic type, it should be understood that the present invention has application in vehicle brake systems which operate according to other principles. Also, because the brake system of the vehicle 22 depicted in FIG. 1 has generally symmetrical construction, for simplicity, only the valves and components of the right side of the vehicle are labeled with reference numbers.

Service braking of the two rear axles HA1, HA2 takes place from a second compressed air supply tank 17. In this case, the compressed air is passed through the two-piece brake valve 21 to be delivered via a relay valve 7 and two ABS valves 6 to brake cylinders 4, 5 of the two rear axles HA1, HA2.

A second port (right) of the supply tank 17 is also in communication with the brake cylinders 4, 5 via an ASR valve 8, the relay valve 7 and the two ABS valves 6. Instead of a common ASR valve 8, it is also possible to provide two ASR valves, i.e., one for each side of the vehicle.

The right port of the supply tank 17 is used for implementation of the ASR function. In cooperation with the ABS valves 6 connected on the output side, the ASR valve 8 is used, in known manner, for unilateral braking of any drive wheel that spins as it starts to move. For this purpose, it is actuated in ASR operation by the ECU 9 so as to cooperate with the associated right or left ABS valve 6 as soon as the ECU 9 detects, via the wheel-speed sensors 11, 13 of the drive axle, that the drive wheels are spinning. Simultaneous actuation of the appropriate ABS valve ensures that the full supply pressure is not introduced.

Indicator lights 14, 15 are provided for monitoring the ABS and ASR functions.

Figure 2:
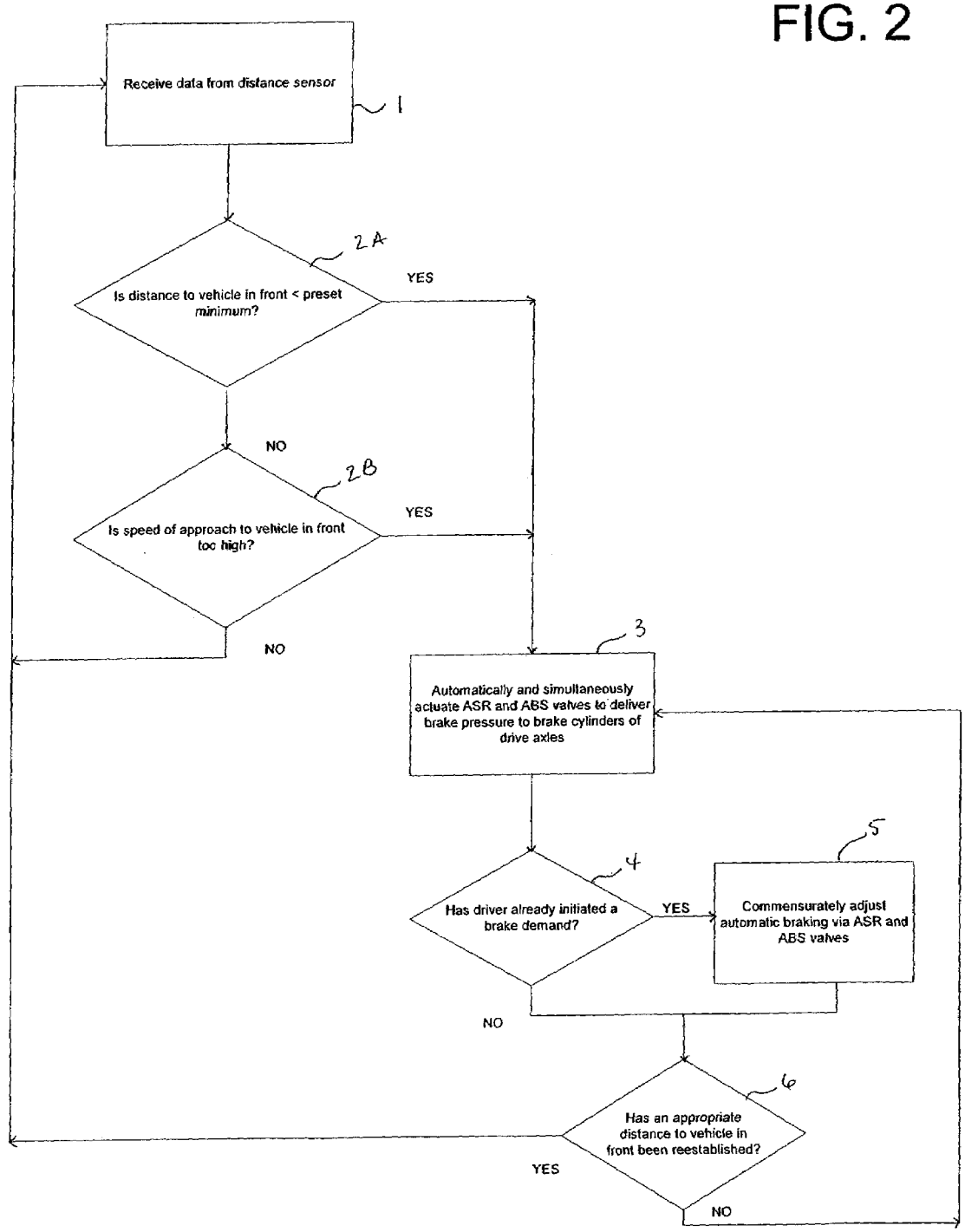
FIG. 2 is a flow chart depicting the process flow for effecting vehicle automatic distance control according to one embodiment of the system and method of the present invention.

Referring now to FIG. 2. a distance sensor 20 for sampling the distance to a vehicle driving in front of the vehicle 22 is also connected to the ECU 9. The connection can be made directly or via a data bus installed in the vehicle 22. The sensor 20 can be of any suitable conventional type which operates on known measurement principles, such as, for example, a radar, infrared or ultrasonic sensor.

When the ECU 9 determines from data transmitted by the distance sensor 20 [step1] that the distance to a vehicle driving in front of the minimum value [decision 2A] or that the speed of approach to the vehicle in front is too high [decision 2B], it simultaneously actuates the ASR valve 8 as well as the two ABS valves 6 connected on the output side thereof, and thus delivers brake pressure to the brake cylinders 4, 5 of the two rear axles HA1, HA2 [step 3]. The vehicle 22 is commensurately braked until an appropriate distance to the vehicle in front is reestablished [see step 6].

The ECU 9 of the vehicle 22 preferably evaluates a combination of the distance to the vehicle in front and an approach speed that is critical for the current distance.

It should be appreciated that brake actuation in connection with automatic distance control according to the present invention requires only software/program enhancement of the ECU 9. Additional hardware (such as additional solenoid valves) is not necessary.

If, in closing the distance between vehicle 22 and another vehicle driving in front, the driver of vehicle 22 has already depressed the brake pedal [decision 4], this is preferably recognized or sensed by the ECU 9, and the automatic braking via the ASR valve 8 and the ABS valves 6 is commensurately reduced [step 5]. For this purpose, the ABS valves 6 and/or the ASR valve 8 can be actuated or closed as appropriate.

If the vehicle 22 includes a trailer vehicle coupled thereto, the trailer can also be automatically braked advantageously by the automatic distance control system. For this purpose, there is provided, according to the present invention, an additional solenoid valve 18 which can be actuated by the ECU 9. The additional solenoid valve 18 is pneumatically connected to the supply tank 17. If the driving distance between the vehicle 22 and a vehicle driving in front becomes shorter than the preset minimum safe distance, the ECU 9 actuates or opens the solenoid valve 18 together with the ASR valves 8. Also, brake pressure is fed via a coupling head 19 to the trailer vehicle.

In one embodiment, it is further provided that, if braking is necessary because the vehicle 22 is getting too close to a vehicle in front, variable pressure control of the brake cylinders 4, 5 of the drive axles is applied as a function of the distance and/or of the speed of approach to the vehicle in front. This is achieved by appropriately graduated actuation of the ABS valves 6. Accordingly, smooth braking adapted to the situation can be achieved. Corresponding variable actuation of the brakes of an attached trailer vehicle is also achieved by graduated actuation of the additional solenoid valve 18.

Accordingly, the present invention enables the automatic distance control system in a vehicle equipped with conventional ABS/ASR to automatically brake the drive axle(s) through actuation of the ASR function when the distance to a vehicle driving in front becomes shorter than the preset safe distance. It should be appreciated that this represents a considerable advance over prior art arrangements in which distance control braking is effected by the retarder alone, since greater deceleration of the vehicle can be achieved when the drive axle(s) is(are) braked by means of the service brake. This is particularly true for loaded commercial vehicles in which the drive axle (rear axle) is carrying a heavier load.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A vehicle, comprising at least one drive axle, an anti-lock brake system, an anti-slip regulation system and an automatic distance control system, said anti-lock brake system and said anti-slip regulation system being controlled by an electronic control unit, said electronic control unit adapted to recognize when a brake pedal of said vehicle has been depressed, said automatic distance control system constructed and arranged to determine when a distance between said vehicle and a second vehicle driving in front of said vehicle is less than a preselected safe distance, said anti-slip regulation system adapted to brake said at least one drive axle of said vehicle when said distance between said vehicle and said second vehicle is less than said preselected safe distance, and means for adjusting braking effected by said anti-slip regulation system based on vehicle braking associated with depression of said brake pedal.

2. The vehicle according to claim 1, wherein said automatic distance control system includes at least one distance sensor for measuring said distance between said vehicle and said second vehicle driving in front of said vehicle, means for transmitting said measured distance to said electronic control unit, and means for comparing said measured distance to said preselected safe distance.

3. The vehicle according to claim 2, wherein said anti-slip regulation system includes one or more valves for controlling the delivery of brake pressure from a source of such pressure to one or more brake cylinders of said at least one drive axle, and said electronic control unit is adapted to simultaneously open one or more of said valves to deliver brake pressure to said brake cylinders to brake said at least one drive axle of said vehicle when at least one of (i) said distance between said vehicle and said second vehicle is less than said preselected safe distance and (ii) and approach speed of said vehicle with respect to said second vehicle is greater that a speed associated with said preselected safe distance.

4. The vehicle according to claim 3, wherein said electronic control unit is adapted to effect variable pressure control of at least one of (i) said one or more brake cyclinders of said at least one drive axle as a function of at least one of (i) said distance between said vehicle and said second vehicle and (ii) said approach speed vehicle by appropriate actuation of one or more valves of said anti-lock brake system.

5. The vehicle according to claim 3, further comprising at least one trailer vehicle coupled thereto, said trailer vehicle including a coupling head, and an additional valve for actuation of said coupling head, and means for opening said additional valve and introducing brake pressure to said at least one trailer vehicle via said coupling head when at least one of (i) said distance between said vehicle and said second vehicle is less than said preselected safe distance and (ii) said approach speed of said vehicle with respect to said second vehicle is greater than said speed associated with said preselected safe distance.

6. The vehicle according to claim 5, wherein said means for adjusting braking effected by said anti-slip regulation system based on vehicle braking associated with depression of said brake pedal includes means for actuating said coupling head.

7. The vehicle according to claim 3, wherein said electronic control unit is adapted to effect variable pressure control of at least one of (i) said one or more brake cylinders of said at least one drive axle and said coupling head and (ii) brake cylinders of said at least one trailer vehicle as a function of at least one of (iii) said distance between said vehicle and said second vehicle and (iv) said approach speed of said vehicle by appropriate actuation of one or more valves of said anti-lock brake system and said additional valve.

8. In a vehicle equipped with at least one drive axle, anti-lock brake and anti-slip regulation systems, an electronic control unit for controlling said anti-lock brake and anti-slip regulation systems, and an automatic distance control system, a method for effecting automatic vehicle distance control, comprising the steps of determining using said automatic distance control system when at least one of (i) a distance between said vehicle and a second vehicle driving in front of said vehicle is less than a preselected safe distance and (ii) an approach speed of said vehicle with respect to said second vehicle is greater than a speed associated with said preselected safe distance, recognizing when a vehicle brake pedal has been depressed, and adjusting braking of said at least one drive axle of said vehicle effected by said anti-slip regulation system based on vehicle braking associated with depression of said brake pedal when at least one of (iii) said distance between said vehicle and said second vehicle is less than said preselected safe distance and (iv) said approach speed is greater than said speed associated with said preselected safe distance.

9. The method according to claim 8, wherein said step of determining when at least one of (i) a distance between said vehicle and a second vehicle driving in front of said vehicle is less than a preselected safe distance and (ii) an approach speed of said vehicle with respect to said second vehicle is greater than a speed associated with said preselected safe distance includes measuring said distance using at least one distance sensor, transmitting said measured distance to said electronic control unit of said anti-lock brake and anti-slip regulation systems and, comprising said measured distance to said preselected safe distance.

10. The method according to claim 8, wherein said anti-slip regulation system includes one or more valves for controlling the delivery of brake pressure from a source of such pressure to one or more brake cylinders of said at least one drive axle, and said step of actuating said anti-slip regulation system to brake said at least one drive axle of said vehicle when at least one of (i) said distance between said vehicle and said second vehicle is less than said preselected safe distance and (ii) said approach speed of said vehicle with respect to said second vehicle is greater than said speed associated with said preselected safe distance includes simultaneously opening one or more of said valves.

11. The method according to claim 10, wherein said electronic control unit effects variable pressure control of said one or more brake cylinders of said at least one drive axle as a function of at least one of (i) said distance between said vehicle and said second vehicle and (ii) said approach speed said vehicle by appropriate actuation of one or more valves of said anti-lock brake system.

12. The method according to claim 10, wherein said vehicle includes at least one trailer vehicle coupled thereto, and an additional valve for actuation of a coupling head attached to said at least one trailer vehicle, and said step of actuating said anti-slip regulation system to brake said at least one drive axle of said vehicle when at least one of (i) said distance between said vehicle and said second vehicle is less than said preselected safe distance and (ii) said approach speed of said vehicle with respect to said second vehicle is greater than said speed associated with said preselected safe distance further includes opening said additional valve and introducing brake pressure to said at least one trailer vehicle via said coupling head.

13. The method according to claim 12, wherein said step of adjusting braking of said at least one drive axle of said vehicle effected by said anti-slip regulation system based on vehicle braking associated with depression of said brake pedal includes actuating said coupling head.

14. The method according to claim 10, wherein said electronic control unit effects variable pressure control of at least one of (i) said one or more brake cylinders of said at least one drive axle and said coupling head and (ii) brake cylinders of said at least one trailer vehicle as a function of at least one of (iii) said distance between said vehicle and said second vehicle and (iv) said approach speed of said vehicle by appropriate actuation of one or more valves of said anti-lock brake system and said additional valve.

15. An automatic distance control system for a vehicle equipped with at least one drive axle, anti-lock brake and anti-slip regulation systems, said automatic distance control system comprising; means for measuring at least one of (i) a distance between said vehicle and a second vehicle driving in front of said vehicle and (ii) an approach speed of said vehicle with respect to said second vehicle, means for determining when at least one of (iii) said distance between said vehicle and said second vehicle is less than a preselected safe distance and (iv) said approach speed of said vehicle is greater than a speed associated with said preselected safe distance, means for actuating said anti-slip regulation system to brake said at least one drive axle of said vehicle when at least one of (v) said distance between said vehicle and said second vehicle is less than said preselected safe distance and (vi) said approach speed is greater than said speed associated with said preselected safe distance, and means for adjusting actuation of said anti-slip regulation system in response to depression of a vehicle brake pedal.

16. The system according to claim 15, wherein said means for measuring at least one of (i) a distance between said vehicle and a second vehicle driving in front of said vehicle and (ii) an approach speed of said vehicle with respect to said second vehicle includes at least one distance sensor, and said means for determining when at least one of (iii) said distance between said vehicle and said second vehicle is less than a preselected safe distance and (iv) said approach speed of said vehicle is greater than a speed associated with said preselected safe distance includes means for transmitting said measured distance to an electronic control unit of said anti-lock brake and anti-slip regulation systems and means associated with said electronic control unit for comparing said measured distance to said preselected safe distance.

17. The system according to claim 16, wherein said anti-slip regulation system includes one or more valves for controlling the delivery of brake pressure from a source of such pressure to one or more brake cylinders of said at least one drive axle, and said electronic control unit is programmed to simultaneously open one or more of said valves to actuate said anti-slip regulation system to brake said at least one drive axle of said vehicle when at least one of (i) said distance between said vehicle and said second vehicle is less than said preselected safe distance and (ii) said approach speed of said vehicle with respect to said second vehicle is greater than said speed associated with said preselected safe distance.

18. The system according to claim 17, wherein said electronic control unit is adapted to effect variable pressure control of said one or more brake cylinders of said at least one drive axle as a function of at least one of (i) said distance between said vehicle and said second vehicle and (ii) said approach speed of said vehicle by appropriate actuation of one or more valves of said anti-lock brake system.

19. The system according to claim 17, wherein said vehicle includes at least one trailer vehicle coupled thereto, said at least one trailer vehicle including a coupling head, and an additional valve for actuation of said coupling head, and means for opening said additional valve and introducing brake pressure to said at least one trailer vehicle via said coupling head when at least one of (i) said distance between said vehicle and said second vehicle is less than said preselected safe distance and (ii) said approach speed of said vehicle with respect to said second vehicle is greater than said speed associated with said preselected safe distance.

20. The system according to claim 19, wherein said means for adjusting actuation of said anti-slip regulation system in response to depression of said brake pedal includes actuating said coupling head.

21. The system according to claim 19, wherein said electronic control unit is adapted to effect variable pressure control of at least one of (i) said one or more brake cylinders of said at least one drive axle and said coupling head and (ii) brake cylinders of said at least one trailer vehicle as a function of at least one of (iii) said distance between said vehicle and said second vehicle and (iv) said approach speed of said vehicle by appropriate actuation of one or more valves of said anti-lock brake system and said additional valve.

\* \* \* \* \*